3,186,858
PROCESS FOR PREPARING REGENERATED
CELLULOSE SPONGES
Edward L. Kosak, Lancaster, and Edward J. Quinn, Tonawanda, N.Y., assignors to General Mills Inc., a corporation of Delaware
No Drawing. Filed May 2, 1962, Ser. No. 192,005
5 Claims. (Cl. 106—122)

This invention relates to a method for regenerating cellulose and more particularly to a method of preparing cellulose sponges.

In the past, cellulose sponges were made by incorporating Glauber's salt into viscose, regenerating cellulose and subsequently leaching out or melting of the Glauber's salt. While this method made sponges of suitable quality for many purposes, expensive equipment was required to recover the Glauber's salt.

In order to overcome some of the deficiencies of the Glauber's salt process, another process was developed, commonly referred to as the "foam viscose" process. This process is described in U.S. 2,927,034. The foam viscose process utilizes a compound to gel the viscose at a rapid rate so that the gas-viscose foam will coagulate before the foam has an opportunity to collapse. Compounds which were utilized were compounds having at least one halogen atom and at least one hydroxyl group located so that the two groups activated one another. Typical compounds which were employed were 2-bromoethanol, ethylene chlorohydrin, chloroacetaldehyde, and the like. In many cases, it would be desirable to have coagulating agents which did not contain halogen atoms.

It is an object of this invention to provide an improved method for preparing cellulose sponge. It is another object of this invention to provide an improved process for preparing cellulose sponge which does not require Glauber's salt. It is a further object of this invention to provide a new class of coagulating agents for the preparation of cellulose sponge. Other objects will appear hereinafter.

The objects of this invention are accomplished by the process which comprises preparing a solution of cellulose and viscose, forming said viscose into a porous structure, regenerating said cellulose by contacting said viscose with an excess of alkali and a regeneration acceleration compound selected from the group consisting of alkylene oxides, alkylene sulfides, and alkylene imines, and recovering a cellulose sponge formed thereby. In accordance with the present invention it was discovered that the alkylene oxides, alkylene sulfides, and alkylene imines provided a new and effective class of regeneration accelerators for cellulose sponges.

The alkylene oxides, alkylene sulfides, and alkylene imines which are useful in the present invention have the structures:

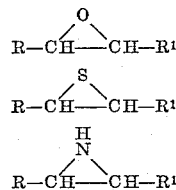

where R and $R^1$ are alkyl radicals. Generally, it is preferred to employ the compounds having 8 or less carbon atoms. Accordingly, R and $R^1$ would have a total of 6 or less carbon atoms. Specific examples of suitable compounds are ethylene oxide, propylene oxide, 1,2-butylene oxide, 2,3-butylene oxide, 1,2-octylene oxide, 3,4-octylene oxide, ethylene sulfide, propylene sulfide, 1,2-butylene sulfide, 2,3-butylene sulfide, 1,2-octylene sulfide, 3,4-octylene sulfide, ethylene imine, propylene imine, 1,2-butylene imine, 2,3-butylene imine, 1,2-hexylene imine, 1,2-octylene imine, and 3,4-octylene imine. The preferred materials are the lower alkylene oxides, particularly ethylene oxide and propylene oxide.

The viscose may be foamed into a porous structure by any of the methods of the prior art. These methods generally include rapidly whipping the viscose so as to introduce air bubbles into the material, bubbling gas through the viscose just prior to the regeneration, or by dispersing a gas-generating chemical through the viscose, and causing the chemical to form gas. Some of the regeneration acceleration compounds of the present invention are normally gaseous. When these materials are employed as the regeneration acceleration compound, they can also be used as all or part of the gas which is bubbled through the viscose to form the foam. For example, ethylene oxide alone, or mixtures of ethylene oxide with an inert gas such as carbon dioxide or nitrogen can be used to foam the viscose into a porous structure while at the same time, regenerating the cellulose. This method has the distinct advantage of eliminating one of the steps in the formation of foam viscose. Generally, it is helpful to add a foaming agent such as an alkyl aryl sulfonate or other alkali stable surface active agents, such as, a fatty acid alkanolamide, a polyoxyethylene alkyl aryl ether, an N-fatty beta-amino propionate, an N-fatty beta-imino dipropionate, tetrahydroxyethyl ethylene diamine, monohydroxyethyl-trihydroxy propylethylene diamine, and N,N,N',N'-tetrakis(2-hydroxypropyl) ethylene diamine. The preferred foaming agent is sodium dodecylbenzene sulfonate. The use of a surfactant permits an easier formation of the foam and has the tendency to stabilize the foam once it is formed.

The amount of accelerating agents employed can be varied over a wide range. The optimum concentration acceleration regeneration material is best determined by trial. As a rough approximation, the amount of regeneration acceleration compound should be on the same order of magnitude as the amount of cellulose in the viscose. Generally, amounts in the range of 10% to 200% by weight, based on the weight of cellulose in the viscose, are preferred.

The invention will be better understood with respect to these following examples which are certain preferred embodiments of the present invention. Unless otherwise indicated, all parts and percentages used herein are by weight.

*Example I*

Two hundred grams of viscose (10% cellulose) was diluted with 300 g. of a 4% sodium hydroxide solution. To this mixture was added 15 g. of sodium dodecyl benzene sulfonate. A total of .55 cu. ft. of carbon dioxide was passed through the mixture foaming it to a volume of 1,500 ml. Ten grams of ethylene oxide in acetone was added to the mixture. This material was then placed in a mold and heated. The material gelled at about 35° C. The sponge was then placed in boiling water to remove impurities. There was obtained a white sponge having approximately normal tenacity for a cellulose sponge and good flexibility.

*Example II*

To 200 g. of viscose (10% cellulose) were added 10.7 g. of sodium hydroxide dissolved in 240 g. of water. To this mixture was added 15 g. of sodium dodecyl benzene sulfonate, 9.2 g. of formalin and 20 g. of ethylene oxide dissolved in 15 g. of acetone. A total of .44 cu. ft. of carbon dioxide was passed through the mixture causing it to foam to a volume of 1,800 cc. This foam was poured into a mold and heated for one hour at 60–65° C. and for another hour at 80–90° C. After washing the sponge in boiling water there was obtained a white open-pored sponge.

*Example III*

With 200 g. of viscose (10% cellulose) were mixed 275 g. of water, 8.8 g. of formalin, 10.0 g. of ethanolamine, and 5.0 g. of dodecyl ethanol amide. To this mixture was added 8.3 g. of sodium hydroxide and 29.0 g. of propylene oxide. After whipping the mixture to a volume of 1,750 ml. the foam was poured into a mold and heated in boiling water. After 30 minutes there was obtained a white-colored sponge product.

*Example IV*

Example III was repeated except that only 14 grams of propylene oxide were employed. There was obtained a coarse-celled cellulose sponge after heating the mold for two hours in a boiling water bath.

*Example V*

Example III was repeated except that propylene sulfide was substituted for the propylene oxide of Example III. Substantially the same results were obtained except that the sponge had a yellowish-green tinge.

*Example VI*

Example III was repeated except that 24 grams of propylene imine was substituted for the propylene oxide. Substantially the same results were obtained as in Example III.

The foregoing examples have been included as illustrations of certain preferred embodiments of the present invention and are not to be construed as limitations on the scope thereof.

The process of the present invention is useful in preparing cellulose sponges which have a variety of household and industrial uses.

The embodiments of the present invention in which an exclusive property or privilege is claimed are defined as follows:

1. The process for preparing cellulose sponges which comprises preparing a solution of cellulose as viscose, foaming said viscose into a porous structure, and then regenerating said cellulose viscose in the presence of an excess of alkali and a regeneration accelerating compound selected from the group consisting of compounds of the formulae (1) 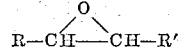

(2) 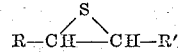

and (3) 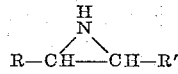

where R and R' are selected from the group consisting of hydrogen and alkyl radicals, the said compounds containing from 2–8 carbon atoms.

2. The process of claim 1 wherein the regeneration accelerating compound is ethylene oxide.

3. The process of claim 1 wherein the regeneration accelerating compound is propylene oxide.

4. The process of claim 1 wherein the regeneration accelerating compound is ethylene imine.

5. The process of claim 1 wherein the regeneration accelerating compound is propylene sulfide.

References Cited by the Examiner

UNITED STATES PATENTS

| | | | |
|---|---|---|---|
| 2,077,412 | 4/37 | Herzog et al. | 106—122 |
| 2,310,969 | 2/43 | Lilienfeld | 106—164 |
| 2,804,728 | 9/57 | Politzer et al. | 51—303 |
| 2,927,034 | 3/60 | Chih | 106—122 |

FOREIGN PATENTS 557,218  11/43  Great Britain.

MORRIS LIEBMAN, *Primary Examiner.*